Aug. 23, 1927.
J. M. HUMISTON
1,639,731
MEANS FOR INSTALLING GROUND PIPES
Filed April 18, 1922
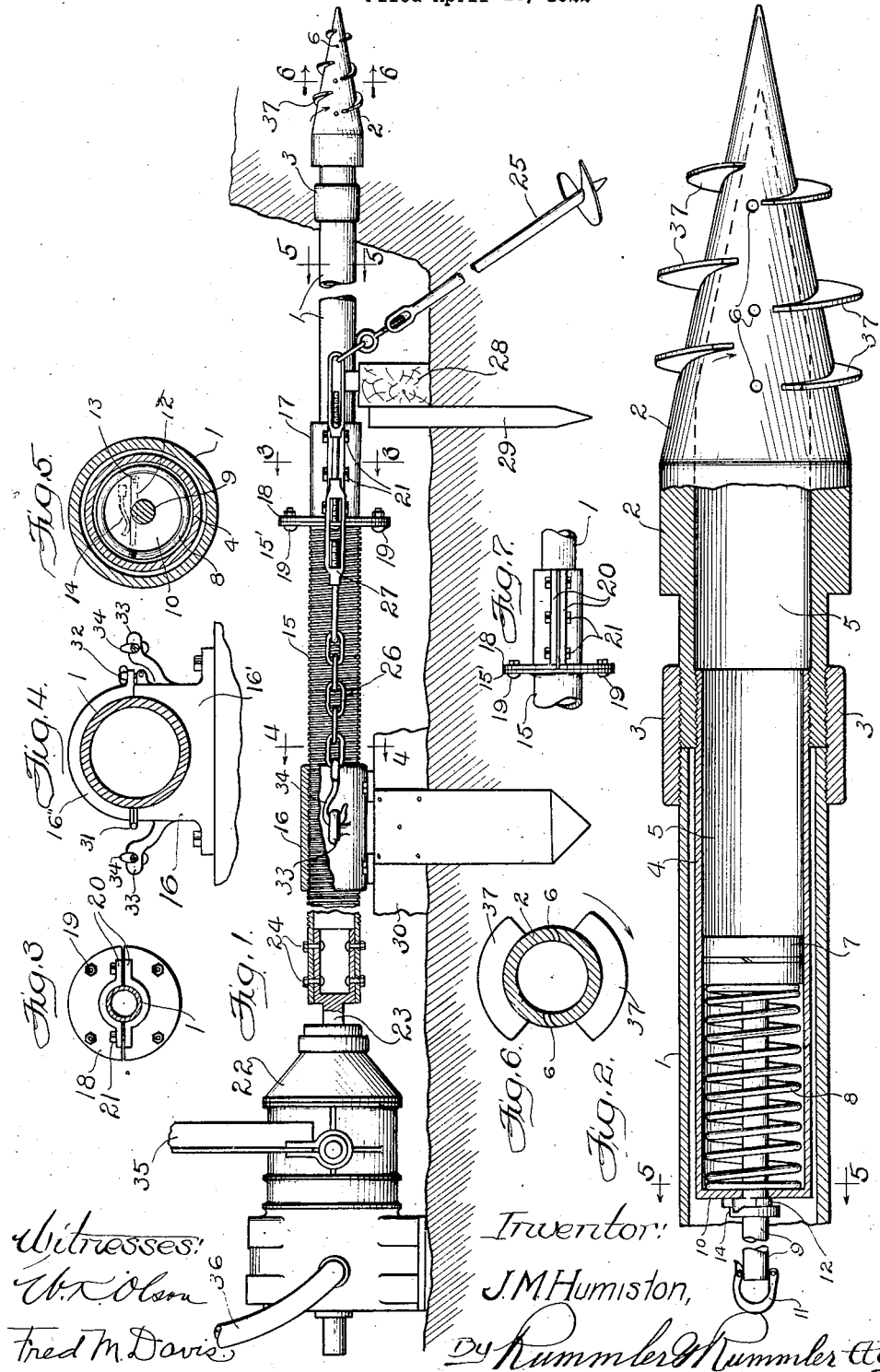
Inventor:
J. M. Humiston,
By Rummler & Rummler Attys Patented Aug. 23, 1927.

1,639,731

UNITED STATES PATENT OFFICE.

JOHN M. HUMISTON, OF BERWYN, ILLINOIS.

MEANS FOR INSTALLING GROUND PIPES.

Application filed April 18, 1922. Serial No. 555,529.

This invention relates to methods and means for driving tubes or the like endwise into or through the ground; and more especially to means for installing rigid tubular conduits or the like, adapted for instance to receive electrical conductors, in the ground wherever it may be desired to avoid excavation and where it may be preferred to forcibly drive the protecting conduit directly into place, as under a wall or street.

The main objects of this invention are to provide an improved method and corresponding adequate means of improved form and operation adapted to facilitate installing pipes or conduits such as above referred to; to provide power means adapted to apply great force in such manner as to overcome ordinary soil resistance even where the ground is very dense and hard packed; to provide means for lubricating the front end of the pipe or pilot-head with which it may be provided; to provide means for applying the force multiplying power of a jack-screw; to provide a form of jack-screw adapted for operation by a motor to accomplish the purposes stated; and to provide ready means for securing to the device referred to the pipe to be driven, in effective screw turning relation.

An illustrative embodiment of this invention is shown in the accompanying drawings, in which—

Figure 1 is mainly a side view of the apparatus set up ready for use in a trench or beside an embankment with the front end of the pipe and pilot-head in the ground, part of the device being in section and part being broken away.

Fig. 2 is a greatly enlarged axial section of the front end of the pipe and associated head and grease cup or magazine.

Fig. 3 is a section on the line 3—3 of Fig. 1.

Fig. 4 is a section on the line 4—4 of Fig. 1.

Fig. 5 is a section on the line 5—5 of Figs. 1 and 2, on the enlarged scale.

Fig. 6 is a section on the line 6—6 of Fig. 1.

Fig. 7 is a side view of the rear end of the pipe and clamp which holds the same.

In the construction shown in the drawings the pipe or conduit 1 is provided with a conoidal pilot-head 2 secured in place by a coupling 3. In the front end of said pipe is a grease magazine or cup 4 for lubricant. The magazine chamber 5 extends forwardly from the cup 4 and includes the interior of the hollow head 2. This head is provided with grease outlet apertures 6 for lubricating the face of the head as it is thrust forward into the ground.

In order to force the lubricant out through the holes 6 a piston 7 is provided in the back part of the cup 4 and this is urged forward by a spring 8 Said piston has a rod 9 extending back through the coil 8 and projecting through the bottom or end wall 10 of cup 4. A handle 11 facilitates retraction of stem or rod 9 and piston 7 against the pressure of spring 8 to permit of charging the chamber 5 with grease. A latch 12 pivoted at 13 on the exterior side of wall 10, engages rod 9 to hold it retracted until the head 2 is fastened in place by the sleeve 3, and the holes 6 are sealed, as will be explained. For this purpose the rod 9 is notched to receive the coacting edge of latch 12. urged by spring 14, as will be understood in view of Fig. 5.

In order to apply great impelling force to the pipe 1 a special form of jack-screw is provided comprising mainly a tubular shaft 15, having operative engagement with an interiorly threaded stationary block 16 of sleeve like character. Member 15 has a flange 15' on its front end to which is secured a clamp member 17 adapted to receive and rigidly embrace the trailing end of the pipe to be driven. Member 17 has a flange 18 corresponding to flange 15' to which it is fastened by bolts 19. The clamp 17 is split to adjustably engage the pipe 1 and has side flanges 20 and bolts 21 for setting the clamp on the trailing end of the pipe.

The member 15 is forcibly rotated to impart longitudinal screw pressure by the motor 22 to which it is connected by means of a coaxially disposed shaft member 23 formed and adapted to insure co-rotation of the motor and shaft 15. The rear end of connector 23 has a square head to fit in the corresponding socket of the motor 22 as will be understood. The other end is cup shaped and fastened to shaft 15 by bolts 24.

In order to provide for positively securing the sleeve 16 stationarily for reaction against the screw shaft 15 an anchor 25 of any convenient form, for instance such as shown in Figure 1, is driven into the ground at the front end of the device, or preferably two such anchors are used, one on each side of the tube 1. Each anchor 25 is provided with a tension member 26, preferably in the form of a chain. Adjusting means in the form of a turnbuckle 27 are provided as will be understood, and as shown in Fig. 1. In order to provide adequate support for the chain and turnbuckle and for the device as a whole a block 28 is placed on the ground whereon the tube 1 and chains rest, said block being also provided with the backing stakes 29 to prevent displacement. A support 30 is provided for the sleeve member 16.

The stationary sleeve 16 is made in sections so as to swing apart on the hinge 31, the lower half 16' being stationary and the upper half 16'' being arranged to swing. The part 16'' is fastened releasably by a bolt and thumb nut shown at 32.

In order to facilitate connection of the tension members 26 to the sleeve block 16 the lower member 16' is provided with a pair of arms 33 adapted to receive the hooks 34 of said chains. These arms 33 are inclined upwardly so as to bring the chain 26 in the same horizontal plane with the axis of the tube 15 and pipe 1.

The motor 22 is provided with a handle member 35 adapted to provide for manual lifting and advancement of the motor as pipe 1 is driven forward. Said motor 22 is also provided with an air supply pipe 36 such as is used for such motors.

In order to increase the effectiveness of the head 2 it is provided with a series of screw shaped flanges or wings 37 disposed to engage the earth and pull the head forward as rotation proceeds supplemented by the thrust of the screw 15. The screw-like head 2 serves to loosen the earth and force it laterally out of the path of the trailing pipe 1.

In order to prevent escape of the lubricant through the holes 6 until actually needed in the boring operation, said holes are sealed by any suitable means as for instance tape, not shown, which is readily brushed aside by the earth when the head requires lubrication.

The operation of the device is as follows: The anchor 25 and blocks 28 and 30 are set in place. The holes 6 are sealed and the chamber 5 filled with grease, whereupon the latch 12 is released so as to bring the pressure of the spring 8 on the lubricant. The head 2 is then screwed to the pipe 1 by means of sleeve 3. The threaded sleeve 16 having been set in place and anchored by the chains 26, the pipe 1 is clamped to the front end of tube 15. The motor 22 is then applied to the member 23 and upon applying power the head 2 is driven into the earth as indicated in Figure 1.

When the head 2 has passed through the earth embankment it is removed from the pipe 1 which is left in place and the clamp 17 is also removed from the trailing end of the pipe. The sleeve member 16'' is then released by loosening the fastening at 32 whereupon the sleeve 15 may be retracted directly without reversal or operation of the motor which is immediately removed by withdrawing from the square head and socket connection at 23.

Although but one complete embodiment of this invention is herein shown and described, supplemented by certain details of a modified construction, it is to be understood that numerous details of the constructions shown may be altered or omitted without departing from the spirit of this invention as defined by the following claims.

I claim:

1. A power device for placing rods or pipes in the ground, comprising a threaded shaft to which the rod or pipe may be attached in co-rotary axial alinement, a non-rotary threaded sleeve to receive said shaft in effective screw relation, ground anchorage means whereon said sleeve may react longitudinally to prevent backing of said sleeve, said anchorage means being longitudinally adjustable whereby new sleeve settings may be made as the work progresses, power means to forcibly rotate said shaft, and a pilot-head adapted to be attached to and carried by the forward end of the rod or pipe when the latter is to be driven forward into or through the ground.

2. A power device for installing rods or pipes in the ground, comprising a threaded shaft to which the rod or pipe may be attached in co-rotary axial alinement, a non-rotary threaded sleeve to receive said shaft in effective screw relation, anchorage means whereon said sleeve may react longitudinally to prevent backing of said sleeve, power means to forcibly rotate said shaft, a pilot head mounted on the forward end of said rod or pipe and means to lubricate the front part of said pilot head when being driven forward into or through the ground, said lubricating means including a reservoir of lubricant mounted on and communicating with said pilot head, and automatic means to apply pressure to said reservoir for forcing out the lubricant onto the surface of said pilot head.

3. A power device for placing rods or pipes in the ground, comprising a threaded shaft to which the rod or pipe may be attached in co-rotary axial alinement, a non-rotary threaded sleeve to receive said shaft in effective screw relation, ground anchorage means whereon said sleeve may react longitudinally to prevent backing of said sleeve, power means to forcibly rotate said shaft, a pilot-head adapted to be attached to and carried by the forward end of the rod or pipe when the latter is to be driven forward into or through the ground, a lubricant magazine mounted on said pilot head adapted and arranged to discharge lubricant upon the forward face of said pilot-head, and means to force the lubricant out of said magazine when the device is in operation.

Signed at Chicago this 17th day of April 1922.

JOHN M. HUMISTON.